(12) United States Patent
Okada et al.

(10) Patent No.: US 7,233,734 B2
(45) Date of Patent: Jun. 19, 2007

(54) AUDIO VISUAL DATA RECORDING/REPRODUCING APPARATUS

(75) Inventors: Masahiro Okada, Osaka (JP); Yuji Tanikawa, Osaka (JP); Shinichirou Takigawa, Kyoto (JP); Satoshi Kawanaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1135 days.

(21) Appl. No.: 10/172,907

(22) Filed: Jun. 18, 2002

(65) Prior Publication Data

US 2002/0191966 A1 Dec. 19, 2002

(30) Foreign Application Priority Data

Jun. 19, 2001 (JP) ............................. 2001-184537

(51) Int. Cl.
*H04N 5/91* (2006.01)
*H04N 7/173* (2006.01)
*H04N 7/16* (2006.01)

(52) U.S. Cl. .................. 386/46; 725/134; 725/142
(58) Field of Classification Search ................ 386/46, 386/40, 104, 124; 725/134, 142; 358/908
See application file for complete search history.

(56) References Cited

U.S. PATENT DOCUMENTS 6,334,022 B1 * 12/2001 Ohba et al. .................. 386/46

6,731,865 B1 * 5/2004 Yamamoto ................... 386/125
6,934,464 B1 * 8/2005 Ayaki et al. .................. 386/95
2002/0161942 A1 * 10/2002 Morinaga ..................... 710/22

FOREIGN PATENT DOCUMENTS

EP           838960 A2 *  4/1998
JP         10-143356      5/1998
JP         2000-187939    7/2000

* cited by examiner

*Primary Examiner*—Thai Q. Tran
*Assistant Examiner*—Syed Y. Hasan
(74) *Attorney, Agent, or Firm*—McDermott Will & Emery LLP

(57) ABSTRACT

In a recording/reproducing apparatus using a hard disk drive (HDD), a connection confirmation/processing program (program for confirming connection with an external equipment and conducting processing required for that connection) which can be executed during starting time of the HDD is stored in a non-volatile memory (e.g., flash memory) of a microcomputer, and a recording/reproduction control program which cannot be executed until the HDD becomes accessible and is greatly affected by extension of the functions and modification of the specification is stored in the HDD.

6 Claims, 3 Drawing Sheets

AUDIO VISUAL DATA RECORDING/REPRODUCING APPARATUS

BACKGROUND OF THE INVENTION

The present invention relates to an apparatus for recording and reproducing audio visual (AV) data.

Recently, a recording/reproducing apparatus using a hard disk drive (HDD) to store audio visual (AV) data is developed. This recording/reproducing apparatus enables implementation of various recording/reproducing modes by utilizing the large storage capacity and fast access of the HDD.

Japanese Laid-Open Publication No. 2000-187939 describes an example of an AV-data recording/reproducing apparatus using a HDD. This apparatus is connected to an external equipment via an IEEE1394 bus, and receives an AV stream and various control commands through the bus.

In view of the ease of extension of the functions and modification of the specification, it is effective for a microcomputer to control the overall operation of the AV data recording/reproducing apparatus. In other words, it is effective to employ a program control system. Moreover, there is a requirement for the AV data recording/reproducing apparatus as an AV equipment to quickly become accessible by the user after power-on (i.e., short starting time). This requires consideration of the storage location of the programs to be executed by the microcomputer.

For reduced starting time, it is convenient to store all programs in a rewritable, non-volatile memory such as a flash memory. However, this type of semiconductor memory has a great limitation on storage capacity, and therefore cannot store a large-size program. For example, a flash memory which is mounted on a microcomputer chip has a capacity of about 256 kilobytes. The use of a non-rewritable, non-volatile memory such as a mask ROM (Read Only Memory) would improve integration, but is not advantageous in terms of extension of the functions and modification of the specification.

For example, a 30 G-byte HDD for storing AV data may have a program storage region for storing all programs, so that the programs may be read onto a main memory, e.g., DRAM (Dynamic Random Access Memory) as necessary for execution. As opposed to the case of a general-purpose personal computer, however, this is not practical in the AV data recording/reproducing apparatus due to the long starting time of the HDD (the time required for the HDD to become accessible after power-on).

SUMMARY OF THE INVENTION

It is an object of the present invention to implement optimal program arrangement in an AV data recording/reproducing apparatus using a HDD, which can achieve both short starting time and easy extension and modification of programs.

In order to achieve the above object, according to the present invention, an AV data recording/reproducing apparatus configured to be connected with an external equipment via a bus separately stores a connection confirmation/processing program (program for confirming connection with an external equipment and conducting processing required for that connection) and a recording/reproducing control program. In other words, the connection confirmation/processing program which can be executed during starting time of a HDD is stored in a non-volatile memory of a microcomputer, and a recording/reproduction control program which cannot be executed until the HDD becomes accessible and is greatly affected by extension of the functions and modification of the specification is stored in the HDD.

More specifically, an AV data recording/reproducing apparatus according to one embodiment of the present invention includes a digital input/output (I/O) interface for receiving and outputting an AV stream via the bus, a recording control section for producing AV data including AV information and management information from the AV stream received through the digital I/O interface, a HDD for storing a recording/reproduction control program and storing the AV data produced by the recording control section, a reproduction control section for reproducing the AV stream based on the AV data read from the HDD, and outputting the reproduced AV stream via the digital I/O interface, and a microcomputer having a non-volatile memory storing a connection confirmation/processing program. The microcomputer executes the connection confirmation/processing program stored in the non-volatile memory during starting time of the HDD after power-on in order to confirm connection with the external equipment via the digital I/O interface and to execute processing required for the connection, and then executes the recording/reproduction control program read from the HDD in order to determine respective operation modes of the recording control section and the reproduction control section.

DESCRIPTION OF THE PREFERRED EMBODIMENTS

Hereinafter, embodiments of the present invention will be described with reference to the accompanying drawings. An AV data recording/reproducing apparatus using a HDD is herein referred to as "AVHDD".

Figure 1:
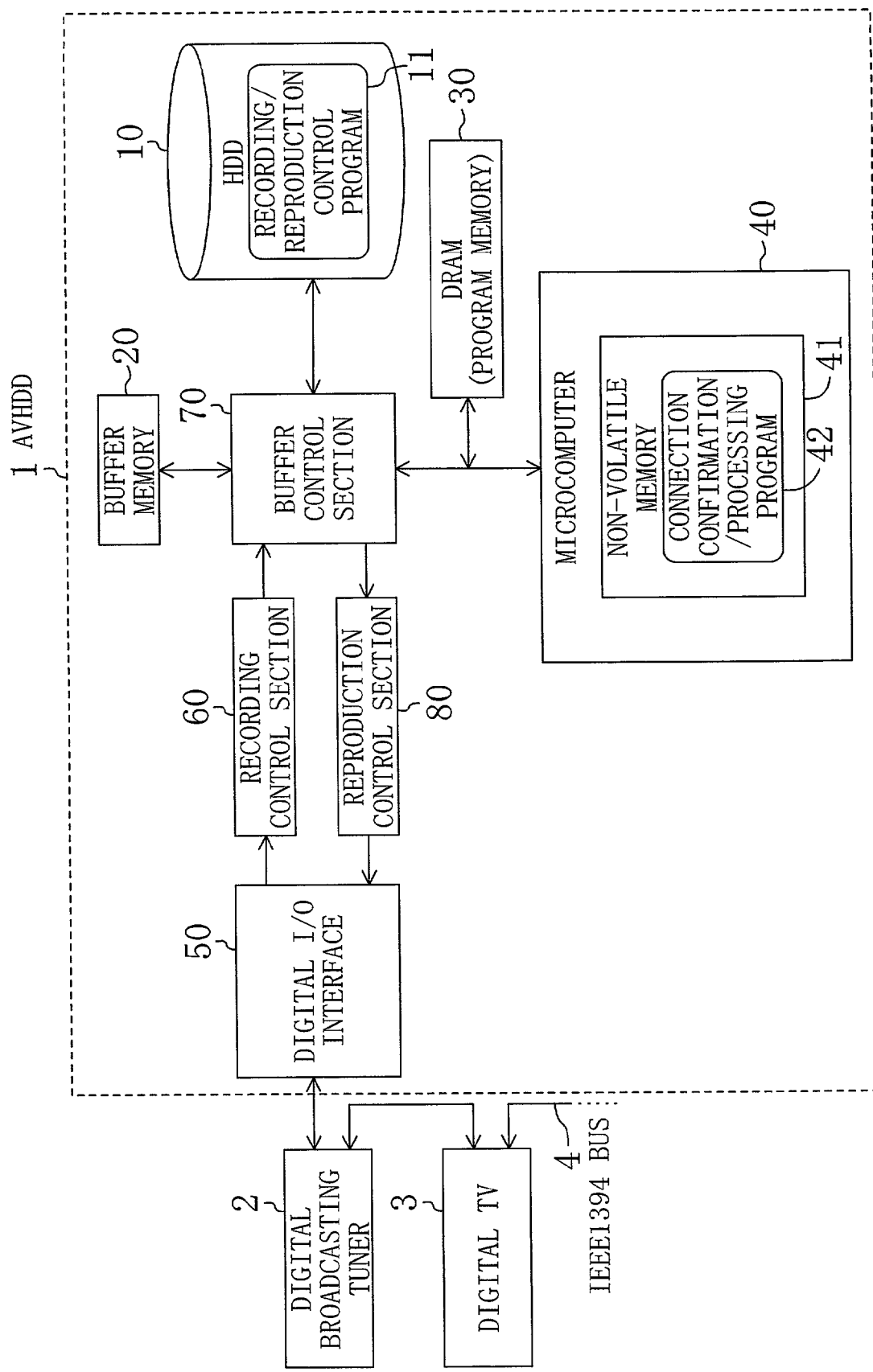
FIG. 1 is a block diagram showing an example of the structure of an audio visual (AV) data recording/reproducing apparatus according to the present invention.

FIG. 1 shows an example of the structure of an AVHDD according to the present invention. Referring to FIG. 1, the AVHDD 1 of the present invention is connected to external equipments such as a digital broadcasting tuner 2 and a digital television (TV) 3 via an IEEE1394 bus 4. The AVHDD 1 includes an HDD 10, a buffer memory 20, a DRAM (program memory) 30, a microcomputer 40, a digital input/output (I/O) interface 50, a recording control section 60, a buffer control section 70, and a reproduction control section 80.

The digital I/O interface 50 receives and outputs an AV stream and various control commands via the IEEE1394 bus 4. For example, the AV stream is an MPEG-2 transport stream for packet-based serial communications. The recording control section 60 produces AV data including AV information and management information from the AV stream received through the digital I/O interface 50. The AV information includes transport stream packets, and the management information includes, e.g., a timestamp. The AV data thus produced by the recording control section 60 is transferred to the HDD 10 through the buffer memory 20. The HDD 10 stores the AV data transferred thereto. The AV data read from the HDD 10 is transferred to the reproduction control section 80 through the buffer memory 20. The buffer control section 70 controls AV-data transfer between the recording control section 60 and the buffer memory 20, between the buffer memory 20 and the HDD 10, and between the buffer memory 20 and the reproduction control section 80. The reproduction control section 80 reproduces the AV stream based on the AV data read from the HDD 10, and outputs the reproduced AV stream via the digital I/O interface 50.

A recording/reproduction control program 11 for determining the respective operation modes of the recording control section 60 and the reproduction control section 80 is prestored in a region of the HDD 10 other than the region for storing AV data. The program memory 30 is a memory for storing the recording/reproduction control program 11 read from the HDD 10 so that the microcomputer 40 can execute the program 11. The microcomputer 40 serves as a controller for controlling the overall operation of the AVHDD 1, and a non-volatile memory 41 is mounted on the microcomputer chip. A program 42 for confirming connection with the external equipments 2, 3 via the digital I/O interface 50 and conducting processing required for that connection is prestored in the non-volatile memory 41 (hereinafter, this program 42 is referred to as "connection confirmation/processing program 42"). The non-volatile memory 41 may either be a flash memory or a mask ROM.

Figure 2:
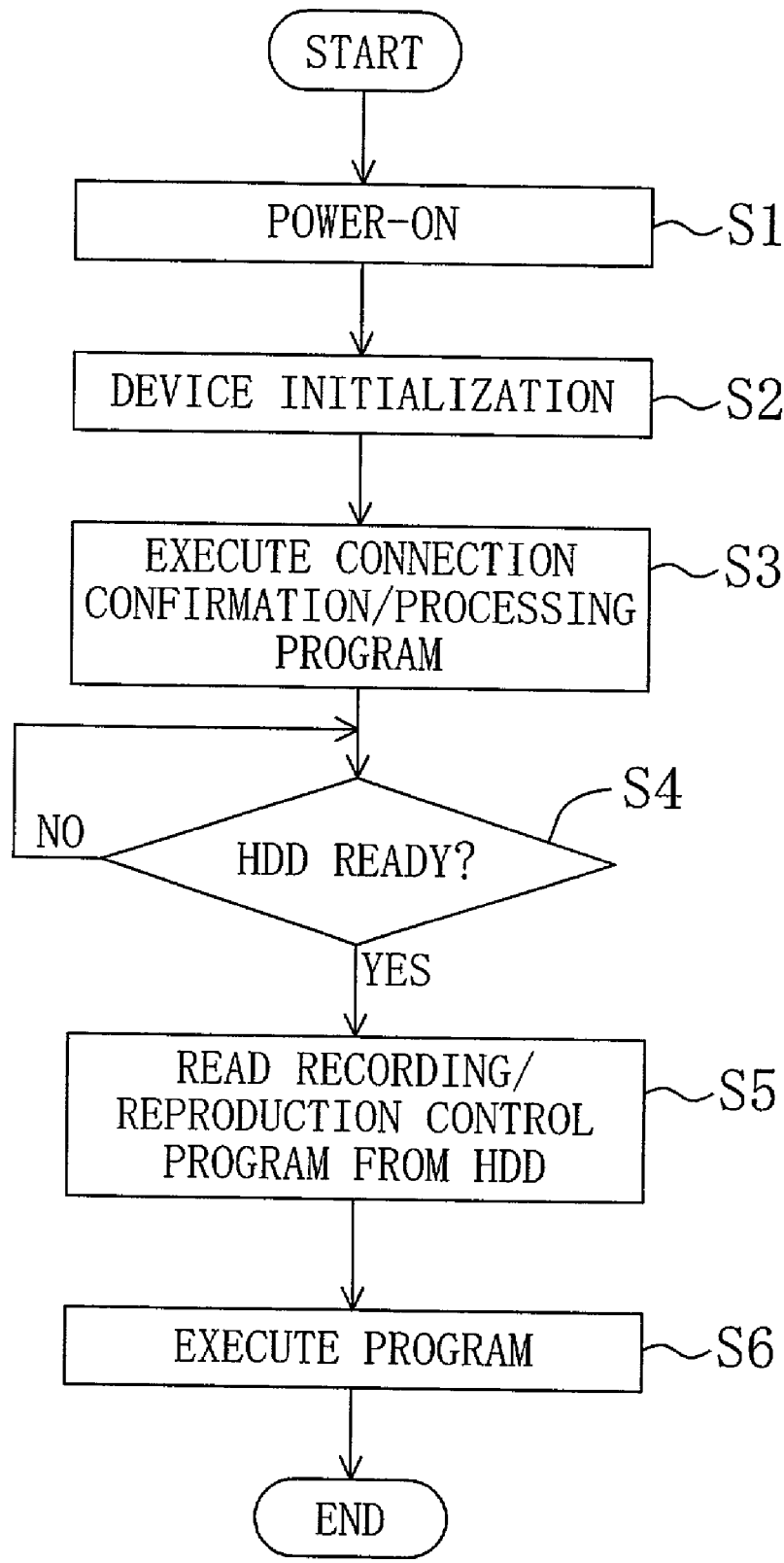
FIG. 2 is a flowchart illustrating operation of the AV data recording/reproducing apparatus in FIG. 1.

FIG. 2 illustrates operation of the AVHDD 1. When the power of the AVHDD 1 is turned ON (step S1), the microcomputer 40 initializes the digital I/O interface 50, the recording control section 60, the buffer control section 70 and the reproduction control section 80, and starts the HDD 10 (device initialization step S2). In step S3, the microcomputer 40 executes the connection confirmation/processing program 42 stored in the non-volatile memory 41 during the starting time of the HDD 10. The microcomputer 40 thus confirms connection with the external equipments 2, 3 via the digital I/O interface 50, and executes processing required for that connection. In step S4, the microcomputer 40 waits for the HDD 10 to become accessible. When the HDD 10 gets ready for access, the recording/reproduction control program 11 is read from the HDD 10 onto the program memory 30 (step S5). The microcomputer 40 then executes the recording/reproduction control program 11 to determine the respective operation modes of the recording control section 60 and the reproduction control section 80 (step S6). Any command applied from the external equipments 2, 3 to the digital I/O interface 50 via the IEEE1394 bus 4 would be rejected during execution of the connection confirmation/processing program 42 by the microcomputer 40.

As has been described above, according to the present invention, the microcomputer 40 executes the connection confirmation/processing program 42 during the starting time of the HDD 10 after power-on. This enables the operation of recording/reproducing the AV data to be started as soon as the HDD 10 becomes accessible. Note that a preprocessing program for recording AV data may additionally be executed during the starting time of the HDD 10.

Since the broadcasting system varies from country to country (e.g., Japan, the United States, and European countries), the recording/reproduction control program 11 must be modified according to the specification of the country where the AVHDD 1 is to be used. Moreover, the recording/reproduction control program 11 must be modified every time the functions of the AVHDD 1 are extended. According to the present invention, however, the recording/reproduction control program 11 is stored in the HDD 10. This facilitates extension of the functions and modification of the specification.

Figure 3:
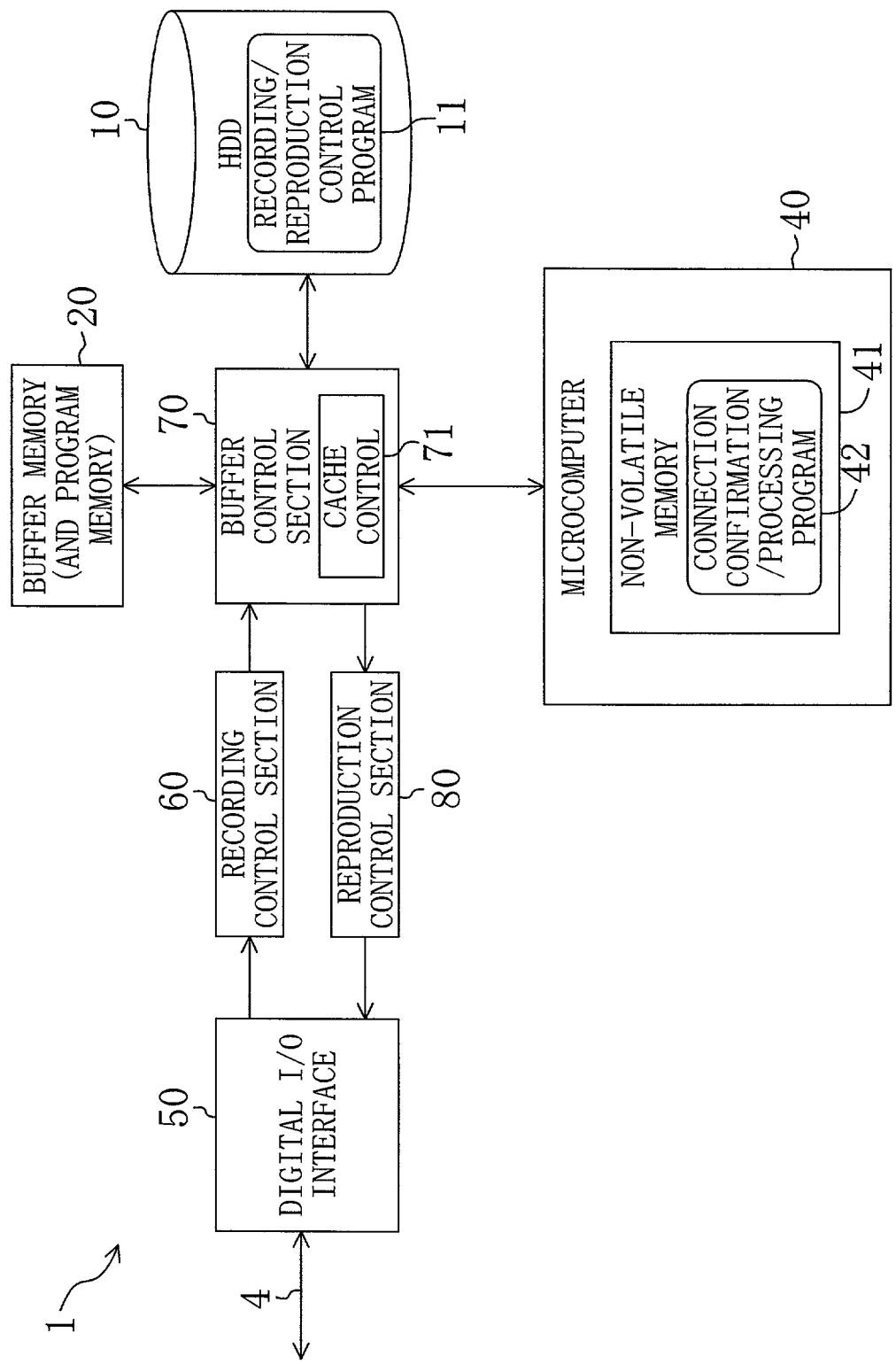
FIG. 3 is a block diagram showing another example of the structure of the AV data recording/reproducing apparatus according to the present invention.

FIG. 3 shows another example of the structure of the AVHDD according to the present invention. The main difference between the structures of FIGS. 1 and 3 is that the DRAM (program memory) 30 is eliminated in FIG. 3. More specifically, the buffer memory 20 serves also as a program memory for storing the recording/reproduction control program 11 read from the HDD 10, so that the microcomputer 40 can execute that program 11. Particularly for high-quality AV data requiring a high data transfer rate, a cache control section 71 may be provided between the buffer memory 20 and the microcomputer 40 so that the microcomputer 40 can execute the recording/reproduction control program 11 without being hindered by the AV data transfer through the buffer memory 20. The structure of FIG. 3 is otherwise the same as that of FIG. 1.

Note that the bus for connecting the AVHDD 1 to the external equipments 2, 3 may be a data communication bus based on a protocol other than IEEE1394.

What is claimed is:

1. An audio visual data recording/reproducing apparatus configured to be connected with an external equipment via a bus, comprising:
   a digital input/output (I/O) interface for receiving and outputting an audio visual stream via the bus;
   a recording control section for producing audio visual data including audio visual information and management information from the audio visual stream received through the digital I/O interface;
   a hard disk drive for storing the audio visual data produced by the recording control section;
   a recording/reproduction control program stored in a region of the hard disk drive other than that for storing the audio visual data, the recording/reproduction control program to be read from the hard disk drive and to be executed;
   a reproduction control section for reproducing the audio visual stream based on the audio visual data read from the hard disk drive, and outputting the reproduced audio visual stream via the digital I/O interface; and
   a microcomputer having a non-volatile memory; and
   a connection confirmation/processing program stored in the non-volatile memory, the connection confirmation/processing program to be executed during starting time of the hard disk drive after power-on,
   wherein the microcomputer executes the connection confirmation/processing program stored in the non-volatile memory during starting time of the hard disk drive after power-on in order to confirm connection with the external equipment via the digital I/O interface and to execute processing required for the connection, and then executes the recording/reproduction control program read from the hard disk drive in order to determine respective operation modes of the recording control section and the reproduction control section.

2. The apparatus according to claim 1, further comprising:
   a buffer memory for temporarily storing audio visual data; and
   a buffer control section for controlling transfer of the audio visual data between the recording control section and the buffer memory, between the buffer memory and the hard disk drive, and between the buffer memory and the reproduction control section.

3. The apparatus according to claim 1, further comprising:
a program memory for storing the recording/reproduction control program read from the hard disk drive, so that the microcomputer can execute the recording/reproduction control program.

4. The apparatus according to claim 2, wherein the buffer memory serves also as a program memory for storing the recording/reproduction control program read from the hard disk drive, so that the microcomputer can execute the recording/reproduction control program.

5. The apparatus according to claim 4, further comprising:
a cache control section provided between the buffer memory and the microcomputer, for conducting cache control so that the microcomputer can execute the recording/reproduction control program without being hindered by transfer of the audio visual data through the buffer memory.

6. The apparatus according to claim 1, wherein any command applied from the external equipment to the digital I/O interface via the bus is rejected during execution of the connection confirmation/processing program by the microcomputer.

* * * * *